(12) United States Patent
Habel et al.

(10) Patent No.: US 9,576,137 B2
(45) Date of Patent: Feb. 21, 2017

(54) METHOD AND SYSTEM FOR ANALYZING INTEGRITY OF ENCRYPTED DATA IN ELECTRONIC CONTROL SYSTEM FOR MOTOR VEHICLE

(71) Applicants: Continental Teves AG & Co. oHG, Frankfurt (DE); Conti Temic microelectronic GmbH, Nürnberg (DE)

(72) Inventors: Stephan Habel, Wendelstein bei Nürnberg (DE); Hans-Leo Ross, Lorsch (DE)

(73) Assignees: Continental Teves AG & Co. oHG, Frankfurt (DE); Conti Temic Microelectronic GmbH, Nürnberg (DE)

( * ) Notice: Subject to any disclaimer, the term of this patent is extended or adjusted under 35 U.S.C. 154(b) by 0 days.

(21) Appl. No.: 14/381,671

(22) PCT Filed: Mar. 5, 2013

(86) PCT No.: PCT/EP2013/054380
§ 371 (c)(1),
(2) Date: Aug. 28, 2014

(87) PCT Pub. No.: WO2013/131900
PCT Pub. Date: Sep. 12, 2013

(65) Prior Publication Data
US 2015/0033357 A1 Jan. 29, 2015

(30) Foreign Application Priority Data

Mar. 6, 2012 (DE) .......................... 10 2012 203 503
Dec. 19, 2012 (DE) .......................... 10 2012 024 818

(51) Int. Cl.
G06F 21/56 (2013.01)
G06F 21/60 (2013.01)
(Continued)

(52) U.S. Cl.
CPC ............... *G06F 21/60* (2013.01); *G06F 21/44* (2013.01); *B60W 50/02* (2013.01)

(58) Field of Classification Search
CPC ...................................................... G06F 21/60
(Continued)

(56) References Cited

U.S. PATENT DOCUMENTS 6,775,824 B1 * 8/2004 Osborne, II ........ G06F 11/3664
714/46
8,131,878 B2 * 3/2012 Staiger .............. G06F 15/17375
327/392

(Continued)

FOREIGN PATENT DOCUMENTS

DE 10141737 4/2003
DE 102006056668 6/2008
(Continued)

OTHER PUBLICATIONS

International Preliminary Report on Patentability for PCT/EP2013/054380, including partial English translation.
(Continued)

*Primary Examiner* — Haresh N Patel
(74) *Attorney, Agent, or Firm* — RatnerPrestia

(57) ABSTRACT

A method for improving the functional security and increasing the availability of an electronic control system, particularly a motor vehicle control system, including hardware components and software components, wherein the hardware components are abstracted by at least one basis software component and/or a runtime environment, and in which an implemented security concept describes two or more software levels, wherein a first software level includes control functions of an application software and a second software level is designed as functional monitoring, for safeguarding against control function faults, wherein a data (Continued)

encryption, provided by at least one hardware component, and/or a data signature for securing the data of at least one communication channel of the hardware component is used with at least one first software component. The invention additionally describes an electronic control system for performing the method.

13 Claims, 3 Drawing Sheets

(51) Int. Cl.
*G06F 21/44* (2013.01)
*B60W 50/02* (2012.01)

(58) Field of Classification Search
USPC .................................................. 726/26, 23
See application file for complete search history.

(56) References Cited

U.S. PATENT DOCUMENTS

| | | | |
|---|---|---|---|
| 8,223,007 B2 | 7/2012 | Kascha | |
| 8,327,153 B2 | 12/2012 | Lee | |
| 8,577,036 B2 | 11/2013 | Porsch | |
| 2006/0282839 A1* | 12/2006 | Hankins | G06F 11/3466 719/318 |
| 2007/0016840 A1 | 1/2007 | Zurawka | |
| 2007/0050542 A1* | 3/2007 | Benhase | G06F 11/08 711/114 |
| 2007/0097959 A1* | 5/2007 | Taylor | G06F 21/10 370/352 |
| 2009/0106571 A1* | 4/2009 | Low | G06F 9/4856 713/310 |
| 2011/0246047 A1* | 10/2011 | Smith | F02D 41/22 701/103 |
| 2012/0151222 A1* | 6/2012 | Koifman | G06F 12/1408 713/189 |
| 2013/0236011 A1 | 9/2013 | Schwarze | |
| 2013/0318607 A1* | 11/2013 | Reed | G06F 11/3062 726/23 |
| 2014/0365180 A1* | 12/2014 | Lam | G06F 17/5004 703/1 |

FOREIGN PATENT DOCUMENTS

| | | |
|---|---|---|
| DE | 102009011430 | 8/2010 |
| DE | 102010039963 | 6/2011 |
| JP | 2005203882 | 7/2005 |
| JP | 2007506591 | 3/2007 |
| JP | 2008520135 | 6/2008 |
| WO | 2009124803 | 10/2009 |
| WO | 2012025375 | 3/2012 |

OTHER PUBLICATIONS

International Search Report for PCT/EP2013/054380 mailed Jun. 14, 2013.
"Autosar," Internet Citation, Nov. 14, 2010, pp. 1-6, XP-002628566, http://en.wikipedia.org/w/index.php?title=AUTOSAR&oldid=396732206, retrieved on Mar. 16, 2011.
German Search Report mailed Jan. 20, 2014 in counterpart German Application No. 10 2012 024 818.0, including partial translation.
Japanese Office Action mailed Apr. 5, 2016 in Japanese Application No. 2014-560333 with English translation.
Chinese Office Action dated May 30, 2016 for Chinese Application No. 201380013045.6, including English translation, 16 pages.

* cited by examiner

METHOD AND SYSTEM FOR ANALYZING INTEGRITY OF ENCRYPTED DATA IN ELECTRONIC CONTROL SYSTEM FOR MOTOR VEHICLE

CROSS REFERENCE TO RELATED APPLICATIONS

This application is the U.S. National Phase Application of PCT/EP2013/054380, filed Mar. 5, 2013, which claims priority to German Patent Application Nos. 10 2012 203 503.6, filed Mar. 6, 2012 and 10 2012 024 818.0, filed Dec. 19, 2012, the contents of such to applications being incorporated by reference herein.

FIELD OF THE INVENTION

The present invention relates to a method for improving the functional safety and increasing the availability of an electronic closed-loop control system and to an electronic closed-loop control system.

BACKGROUND OF THE INVENTION

Important safety aims for developments in electronic closed-loop control systems, particularly in automobile electronics, stem from the effects in the event of malfunctions in these systems. Critical effects in the event of malfunctions or failures may be locking of the wheels of a vehicle or excessive, unwanted braking torque on the rear axle with the possible consequence of destabilization of the motor vehicle. By way of example, functions that comprise autonomous acceleration can result in destabilization, particularly for severe torque increases when electric motors are used as drive units. For this, ISO 26262, which is incorporated by reference, provides general focusing for the safety aims of excessive unwanted effects or undersized or negative unwanted effects being avoided, which is why most systems need to protect a flexible corridor for their safety concepts. The tolerable, unwanted torque is situated within this corridor, in which the vehicle needs to be able to be safely controlled in all admissible driving situations. Above this corridor, there are dangerous acceleration effects, for example, while below there is locking of the axles or wheels. The form of the corridor is essentially dependent on the vehicle specifications, such as axle spacing, weight, center of gravity and further parameters, such as speed, road condition, lateral acceleration, curve radius, etc. Such a corridor even exists for stable driving straight ahead.

The upper and lower limits need to be stipulated in accordance with the safety requirements (e.g. ASIL) of the respective function and the vehicle specifics and also the further parameters. The possible erroneous triggering of an undersized or excessive unwanted torque by a driver assistance function that influences the acceleration of the vehicle can require this function to be grouped into a high safety requirement level, such as ASIL D. This means that an error in this function can immediately result in a risk to persons.

According to IEC 61508, which is incorporated by reference, the safety aim of transferring a system to a safe state is pursued, inter alia, which frequently results in a switch to a zero-current state in the event of an error occurring. This is intended to limit a potential risk to persons. For this reason, a plurality of safety aims exist, particularly according to ISO 26262, wherein the safe state is a state that does not present any risk to persons but does not necessarily lead to a zero-current or zero-energy state.

As a fundamental safety concept for engine, transmission, steering and other chassis control systems, DE 10 2006 056 668 A1, which is incorporated by reference, describes a method for ensuring or maintaining the operation of a complex safety-critical overall vehicle closed-loop and/or open-loop control system in the event of the occurrence of errors, malfunctions or other events that have an influence on the availability of subfunctions. For this, modes of operation are defined for the necessary system components, with the modes of operation that are affected by the errors that have occurred being ascertained in the event of error. From the modes of operation that are still available, a selection is then made, in view of the most extensive possible availability of the overall system, and hence the performance of the system is degraded in stages.

Particularly for engine management systems in electromobility, it is necessary to consider implementations up to the highest safety requirement level (e.g. ASIL D). Unwanted effects, as are described above, are considered particularly in the case of multilevel software architectures for safety-relevant motor vehicle control systems. Essential safety functions are accordingly implemented by means of appropriate design of the hardware and software and the interaction thereof, and particularly the independence of the safety functions that is required by ASIL, e.g. for data communication, is achieved by means of data encryption. If it is no longer possible to decrypt the key at the receiver, a disconnection path, such as an intelligent watchdog (window watchdog), is used to disconnect the communication or the entire system.

Modern generations of (multicore) microcontrollers have inherently known safety mechanisms for the entire hardware, with the redundant processors frequently operating in a synchronous or asynchronous lockstep mode, so that single, multiple or brief errors can be controlled. A microcontroller within the context of this description is also understood to mean microprocessors, microcontroller systems and microprocessor systems, which have at least one processor and are able to capture and output signals via peripheral functions.

A time delay in the execution of tasks between redundant processors allows errors to be tolerated within a safety time (e.g. less than 1 ms) on account of integrated hardware safety mechanisms, since these errors are prevented from causing a potentially dangerous situation by at least one safety mechanism. By way of example, the safety mechanism could be data correction that corrects data identified as incorrect and uses said corrected data for further processing.

The communication by the hardware, such as by a microcontroller with its peripherals, can be protected against different types of error by error correction methods (ECC), error detection methods (EDC) and/or end-to-end data encryption (E2E). EDC is important for controlling the error correction, so that tolerances or reactions can be adapted upon the occurrence of a plurality of and/or transient errors. Digital output values from peripheral units, such as analog-to-digital converters, can be protected by means of EDC, for example, the values of the analog input variables being protected by means of two independent potential bands separated by an undefined range. By way of example, values greater than 4.5 V may correspond to a high level and values less than 0.5 V may correspond to a low level. The validity registers are then coupled to the digital output values during the analog-to-digital conversion as data encryption or a data signature.

For motor vehicle controllers, there is increasing standardization of the software architecture or use of runtime environments (RTE) in order to improve the portability, reusability and safety of software modules, inter alia, and ultimately also to save development costs. For the application software of a motor vehicle controller, a standardized environment is therefore provided that is no longer directly influenced by technical influences of the microcontroller. For architectural analysis for the purpose of establishing all the actually possible error influences of a microcontroller on the software implemented thereon, it is essentially necessary to check every property of the microcontroller. In the event of a change to another microcontroller type or if the manufacturer of the microcontroller changes the production technique or materials used, this needs to be taken into consideration. The advantage of using standardized software architecture is therefore that no or only small adaptations to this application software need to be made in the event of changes to the hardware.

A further safety principle according to the prior art is explained below using the example of the standardized software architecture AutoSar® (AUTomotive Open System ARchitecture®). Version 4 of AutoSar® specifies E2E safety for a communication channel from basic software to a level of a runtime environment (RTE). At a software level that is based on a microcontroller abstraction level, the crude information that is present from the peripherals as input signals is encrypted and, following transfer of the encrypted data by the software levels, decryption takes place in the region of the RTE. The application software, which is superordinate to the RTE as a further level, can then use these data for further processing. Thus, software-based E2E data encryption by AutoSar® takes place, with particularly the hardware software interface not being protected. However, no safety-relevant influence is permitted to take place on software for function monitoring, communication channels of the peripherals, degradation software or further safety software. The division of the control functions and the function monitoring and also the hardware or system protection, for example in the basic software, into different software levels allows possible error propagations to be reduced and hence error cascades, such as in the case of separate controllers, to be avoided or interrupted.

Basic errors that affect the application software from the hardware may be data that are corrupted by a wide variety of causes or that are generated incorrectly, for example. In addition, it is possible for data not to be made available to a software process in good time as a result of errors in the hardware.

SUMMARY OF THE INVENTION

An aspect of the invention improves the functional safety and increases the availability of safety-relevant electronic systems, particularly in a motor vehicle.

An aspect of the invention describes a method for improving the functional safety and increasing the availability of an electronic closed-loop control system, particularly a motor vehicle control system, comprising hardware components and software components, wherein the hardware components are abstracted by at least one basic software component and/or at least one runtime environment and in which an implemented safety concept describes two or more software levels, wherein a first software level comprises control functions of a piece of application software and a second software level is in the form of a function monitor particularly for the purpose of protecting against errors in the control functions, wherein the invention is furthermore distinguished in that data encryption and/or data signature, provided by at least one hardware component, is used for data protection for at least one communication channel of the hardware component with at least one first software component. Advantageously, the interface from the software to the hardware is thus additionally protected, which means that the inventive method achieves independence between the software components themselves and also between software components and hardware components. Erroneous influencing is therefore avoided or can be detected.

According to a particularly preferred embodiment, the first software component is an integrity manager, wherein the encrypted and/or signed data communicated via the communication channel are provided for the integrity manager and/or the runtime environment and/or the basic software component, and the integrity manager checks the integrity of the communicated data from the communication channel, wherein the integrity manager uses particularly the data encryption and/or data signature for checking the integrity of the data. The application software can therefore advantageously also be implemented for extremely safety-relevant functions. The function monitor would not have the need to control external influences by the hardware, but rather would only need to protect against systematic errors that can arise as a result of specification and implementation errors. Data corruption by external influences is avoided thereby.

The integrity manager provides particularly preferably the unencrypted and/or unsigned information data for the application software if the integrity of the encrypted and/or signed data is essentially existent. Preferably, the existence of integrity for the respective safety requirement level, in relation to a particular data transmission link, is determined. Advantageously, the infringement of independence at a defined location is therefore provided for a degradation.

In accordance with a preferred embodiment, the integrity manager generates an error code, which can be processed particularly by the application software, if the integrity of the encrypted and/or signed data is not existent, wherein the unencrypted and/or unsigned information data are not provided for the application software, or are provided just together with the error code, and/or the unencrypted information data are assigned an implausible value.

Preferably, the integrity manager is subordinate to the application software and/or superordinate to the runtime environment and/or implemented in the runtime environment, wherein the runtime environment provides the encrypted and/or signed data for the integrity manager.

Preferably, a degradation manager is provided that is in the form of at least one third software level and/or in the form of at least one software process of the first and/or the second software level, wherein the degradation manager comprises at least one degradation level for the control functions of the first software level and/or a function monitor for the second software level.

Preferably, a disconnection function of the degradation manager is executed by at least one software process with high, particularly maximum, priority. This advantageously realizes deterministic achievement of the respective safe state(s).

In accordance with a preferred embodiment, the integrity of the data and/or the generated error code is/are taken as a basis for the degradation manager to execute one or more selective disconnections and/or degradations for the performance of the motor vehicle control system and/or the control functions and/or the function monitoring. Advantageously, this allows strict disconnection of the system in the event of error to be avoided and selective disconnection of functions to be realized. Hence, a maximum possible system availability, on the basis of the error, can be maintained in order to realize the emergency driving programs, for example, that can be used to leave a hazard area or to reach a service garage, for example. A resulting consequence is advantageous conformity of the safety concept particularly with ISO 26262, since it is possible to ensure that a safe state that is valid for the relevant error situation is reached.

Preferably, the integrity manager provides the application software with implausible information data in the case of transient errors and/or with a generated error code in the case of permanent errors. Hence, it is advantageously possible for the selective disconnection and/or degeneration of the performance of the motor vehicle control system to be provided on the basis of available data encryptions and/or data signatures without having to provide further diagnosis measures. By way of example, it is therefore possible to dispense with separate failure safety mechanisms for sensor data from intelligent sensors.

The function monitor and/or the degradation manager and/or the integrity manager can preferably access the data encryption and/or data signature of the data. The advantage is that the function monitor is informed about the plausibility of the data communicated to the peripherals, for example.

According to a further preferred embodiment, the function monitor and/or the degradation manager use the data encryption and/or data signature for additional plausibilization of the data.

Preferably, for a communication channel between software components, software functions and/or software processes, the data encryption and/or data signature is/are checked by the receiving software component. This is advantageous particularly in the case of multiprocessors because the data communication between software components can always be corrupted by data buffer-storage or processing in the microcontroller.

Preferably, a restart and/or synchronization for the program flow of a microcontroller executing the method is provided in the course of operation, particularly within a safety time, wherein a safe state is initiated by a disconnection means, particularly by a watchdog, if the safety time is exceeded.

The integrity manager ensures preferably data-oriented and/or temporal separation for, in particular independent and/or perturbation-free, software components, wherein the data-oriented and/or temporal separation is preferably used to disconnect software components with different safety requirement levels selectively and/or in prioritized fashion particularly if independence is infringed. Advantageously, an abstracted software architecture is therefore provided for the application software, which software architecture is essentially free of erroneous, unascertainable hardware influences.

The invention furthermore relates to an electronic closed-loop control system, particularly a motor vehicle control system, for executing a method as described above. Software architecture analysis is advantageously limited for the inventive system to possible systematic errors that reduce to possible systematic errors in a piece of application software. This prevents errors that arise particularly in the development of the software components.

BRIEF DESCRIPTION OF THE DRAWINGS

Further preferred embodiments can be found in the description below of exemplary embodiments with reference to figures, in which.

DETAILED DESCRIPTION OF THE INVENTION

Figure 1:
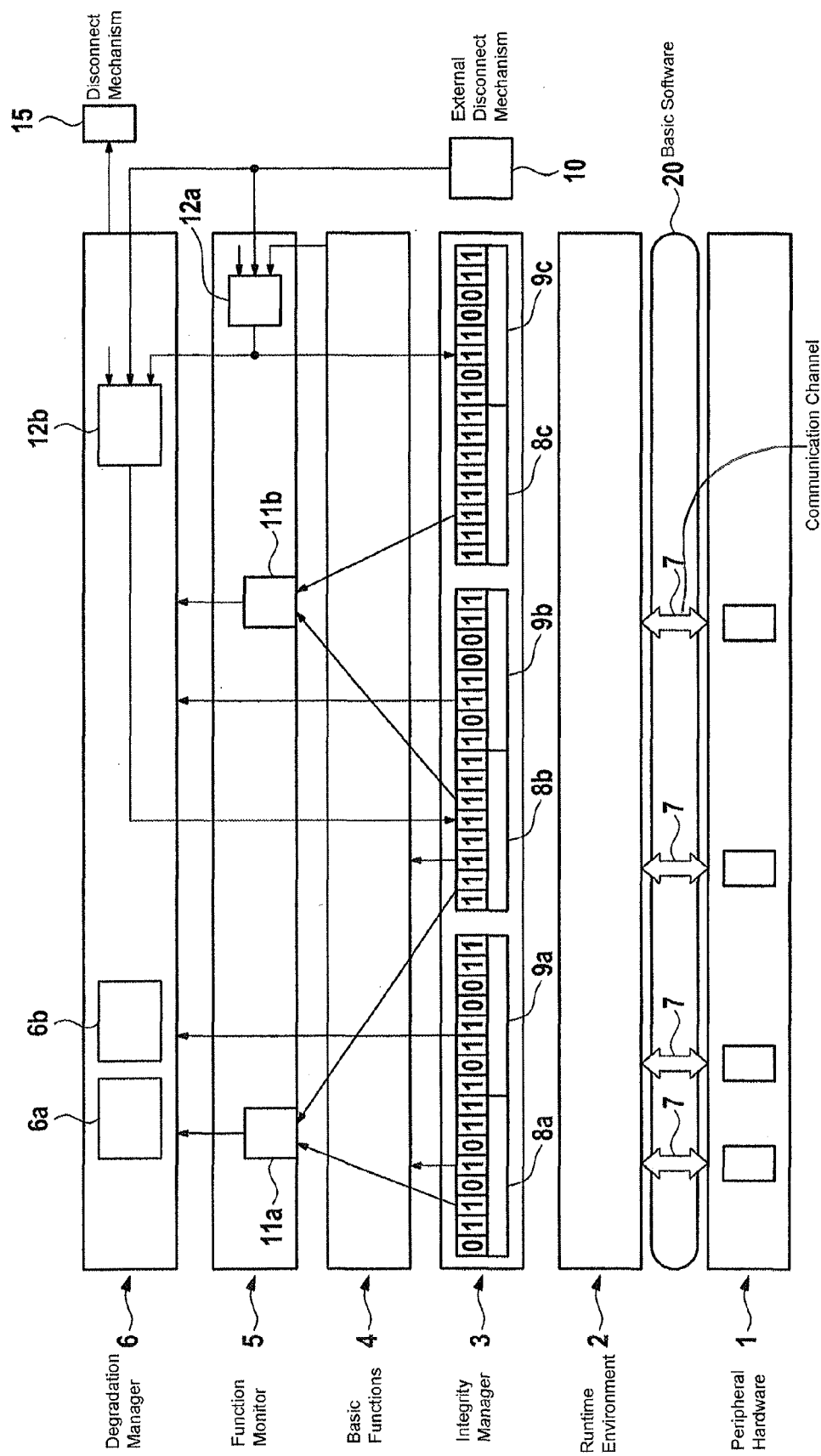
FIG. 1 shows a basic illustration to describe the manner of operation of the inventive method.

FIG. 1 shows the basic manner of operation of the invention for improving the functional safety and increasing the availability of an electronic motor vehicle control system. Accordingly, a motor vehicle control system is also intended to be understood to mean open-loop controllers of any motor vehicle components. As an aid to understanding the invention using the example of a motor vehicle control system, only the most essential components thereof are depicted and/or described.

For the purpose of abstracting the hardware of a microcontroller executing the software components described below, the runtime environment 2 and the basic software 20 are executed by said microcontroller. In this context, software components are understood to mean particularly software processes, software functions and/or software levels. The central element is the integrity manager 3, which monitors the safety-oriented integrity of the data communication and can provide the necessary conditions in order to transfer the motor vehicle control system to a selective safe state by means of the degradation manager 6.

The safety concept essentially provides three levels of the application software 4, 5, 6, with the first level 4 comprising the control functions (basic functions), for example motor vehicle brake control, the second level 5 executing the function monitoring for the control functions 4 and the third level 6 being in the form of a degradation manager for different degradation levels and degradation scenarios for the system. For the function monitor 5, the control functions 4 are executed in a manner known per se by means of diverse software algorithms for the purpose of protecting against systematic errors. Each software level may preferably be implemented as an independent process of the basic software or of the operating system and/or the application software. Particularly the function monitor 5 and the degradation manager 6 may be divided into various processes 6a, 6b, also with various safety requirement levels, e.g. into ASIL B and ASIL D.

Further monitoring of the software components, for example monitoring of the independence and also time monitoring, are implemented in a manner known per se by a flow monitor 10 with a downstream disconnection mechanism 15, such as a process scheduler. By way of example, this monitors infringements on the partition, the memory monitoring, the entry conditions for processes to be executed and the temporally and logically correct execution thereof. FIG. 1 illustrates the incorporation of the flow monitor 10 into the function monitor 5 and the degradation manager 6 via the condition blocks 12a and 12b.

In the event of error, the function monitor 5 and/or the degradation manager 6 can transfer or degrade the motor vehicle control system or separate control and/or application functions to a safe state, which allows performance degradation to be performed and the scope of functions to be reduced. The availability and error tolerance of the motor vehicle control system is substantially improved by these measures. By way of example, the supply of power to an engine that threatens to overheat can be actively limited.

All the disconnection mechanisms of the degradation can be effected selectively, which means that the basic functions of the microcontroller essentially do not need to be disconnected. A disconnection mechanism 15, for example a watchdog, would therefore not be absolutely necessary even for safety functions with a high safety requirement level such as ASIL D. The use of a disconnection mechanism 15 becomes necessary only if it is used for disconnecting the hardware of the executing microcontroller. Safety-dependent restarting of the microcontroller is therefore largely avoided and system availability is substantially improved. For realization, it is possible for appropriate, encrypted instructions of the software components to be connected to an output pin of the executing microcontroller and hence for the safe state to be initiated. To allow corresponding redundancy on the hardware side, inherently known bridge circuits or activation lines can be used in order to initiate a safe state. Since software components of a microcontroller are executed not simultaneously but rather sequentially, it is necessary to take account not only of data-oriented separation but also of temporal separation, this likewise being monitored and ensured by means of the external disconnection mechanism 15.

In accordance with the example, the executing microcontroller can be restarted within the safety time, this being advantageous particularly in the case of the use of a single-core microcontroller, since there are no redundancies. The outputs of the microcontroller are put into a static state during the restart and, within the safety time, the restart and the synchronization with the program flow take place. This approach does not bring about a safety-critical state for the motor vehicle control system during a restart, since all of the peripherals remain operational and even auxiliary functions, such as the communication, do not need to be interrupted. If a restart is not possible within the safety time, the external disconnection mechanism 10 transfers the motor vehicle control system to a safe state. If the disconnection paths are operated by means of a process (task) by the degradation manager 6 with the maximum priority, temporal determinism is achieved for the safe reaction of the system, which means that the system behaves essentially correctly or as expected over time in the event of an error occurring.

Instead of pure software data encryption between the software levels of the software architecture, as has already been described using the example of AutoSar®, the data encryption and/or data signature is/are used by existent hardware 1 of a motor vehicle, such as by sensors, actuators, interfaces, analog-to-digital converters and/or by components of the motor vehicle controller per se. Hence, the interface of the software components to the hardware 1 is additionally protected.

The hardware 1 communicates with the motor vehicle controller or the microcontroller. The communicated, encrypted data 8*a*, 9*a* . . . 8*c*, 9*c* comprise the information data 8*a* . . . 8*c* and also the associated data encryption 9*a* . . . 9*c* and/or data signature of the hardware 1. The communication channel 7 is used to provide the encrypted data 8*a*, 9*a* . . . 8*a*, 9*c* for the integrity manager 3. The communication channel 7 is protected on the basis of this end-to-end data encryption. Single, multiple and transient errors can therefore be identified. There is no limitation to E2E data encryption on the basis of AutoSar®, for which reason it is alternatively possible for Cray-coded or additional check patterns and unencrypted information, for example, to be used as impressed data signatures in the data formats. By way of example, modern analog-to-digital converters are monitored by dedicated safety mechanisms, with the data produced in this manner also being incorporated into the ECC and EDC. These safety mechanisms can therefore also be used for the encryption. The communication by peripherals with the microcontroller takes place in a manner known per se by means of peripheral buses, for example, such as SPI, or analog or digital communication.

The integrity manager 3 reads the incoming data 8*a*, 9*a*, . . . 8*c*, 9*c* and analyzes the integrity thereof, the latter being determined from the plausibility, correctness, soundness and/or currentness of the data 8*a*, 9*a*, . . . 8*c*, 9*c*, and different degrees of integrity also being able to be distinguished. If data integrity is essentially present, the application software 4, 5, 6 is provided at least with access to the information data 8*a* . . . 8*c* for further processing. Alternatively, the integrity manager 3 releases the encrypted data 8*a*, 9*a*, . . . 8*c*, 9*c* completely, said data being decrypted by the respective receiving software component.

The restriction of error propagation in order to obtain safety in the face of multiple errors is achieved by using the function monitor 5 and/or the degradation manager 6 for a plausibilization of the integrity of data 8*a*, 9*a*, . . . 8*c*, 9*c* with a relatively low safety requirement level, such as ASIL B, for disconnection functions with higher safety requirement levels, such as ASIL D. This realizes not only the integrity check by the integrity manager 3 but also a second independent safety mechanism. FIG. 1 illustrates this by means of condition blocks 11*a* and 11*b*, the basis used being able to be various data blocks from a communication channel 7 and/or data 8*a*, 9*a*, . . . 8*c*, 9*c* from various communication channels and also any combinations of the information data 8*a* . . . 8*c* and/or data encryptions 9*a* . . . *c* of various data 8*a*, 9*a*, . . . 8*c*, 9*c*.

If there is an error in the motor vehicle control system, the integrity manager 3 transfers an error code, generated as appropriate on the basis of an error diagnosis, to the application software 4, 5, 6, but particularly the function monitor 5 and/or the degradation manager 6. If an error is recognized from the plausibility check by the function monitor 5, the relevant information is forwarded to a degradation manager 6 by the function monitor 5, for example using an error code. On the basis of the information provided by the integrity manager 3 regarding the data integrity and any errors, the plausibility check and the incorporation of the flow monitor 10, it is possible to perform detailed error analysis. This allows precise measures from much more complex degradation concepts, with errors being able to be tolerated and degradations in the performance of the system being able to be performed. The safety time of the microcontroller is likewise significant to a reaction by the degradation manager 6. In this case, the degree of detail in an error analysis can be made dependent on the grouping into the respective safety requirement level. For a control command for an actuator, for example, it is necessary to provide internal diagnosis information within the application software 3, 4, 5, so that safety-relevant actions can be initiated. On the basis of the example, an output of the microcontroller is enabled for a safety-relevant function only if timely and correct data transmission to the output is inferred from the diagnosis information.

Besides the error that has occurred, per se, it may be crucial, inter alia, to a corresponding degradation concept whether a transient or permanent error is involved and/or into what safety requirement level an affected software component is classified. Insofar as it can be ascertained, it is also possible to take account of whether the present error could have occurred as a result of conscious external influencing, for example via a security leak in the motor vehicle control system, or in another way.

By way of example, the integrity manager 3 can, in the event of transient errors, change at least the information data 8a . . . 8c to implausible values, disable access by the application software 4, 5, 6 or continue to provide said access. If an error in the data encryption 9a . . . 9c has arisen and has been established by the integrity manager 3, for example, the information data 8a . . . 8c can, in principle or temporarily, continue to be used by the application software, for which reason the integration manager 3 provides the information data 8a . . . 8c for the application software 3, 4, 5 and transfers an error code to the degradation manager 6. If such an error continues to be present after a defined time, an appropriate reaction can be initiated by the degradation manager 6.

In the descriptions below that pertain to the further figures, in order to avoid repetition, essentially only the differences over the embodiment described above will be discussed, and for simplification purposes elements that are the same are provided with the same reference symbols and in each case only details that are essential to the invention are explained.

Figure 2:
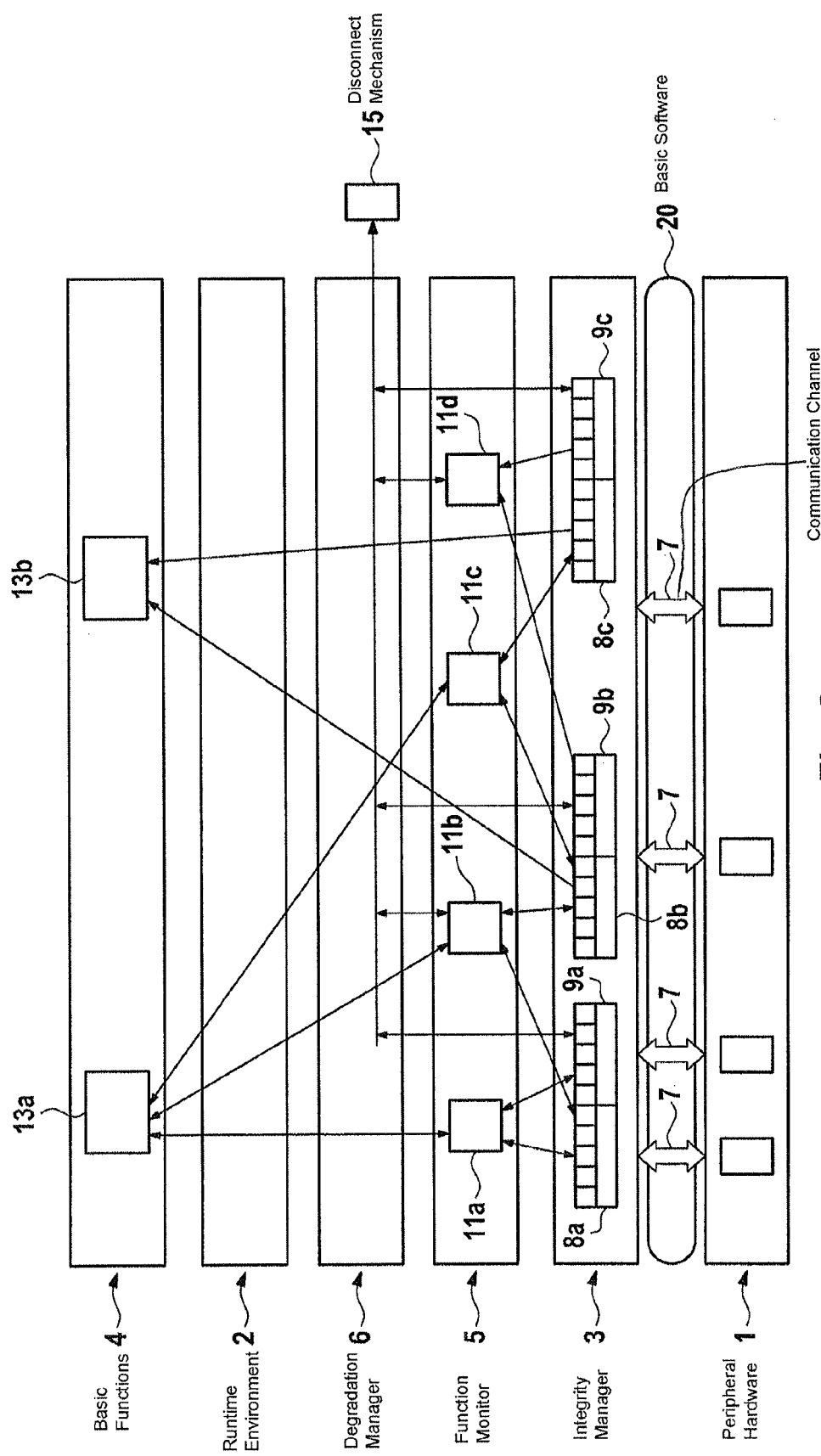
FIG. 2 shows a basic illustration, with an alternative arrangement of the software levels being present.

Without being restricted thereto, the exemplary embodiment in FIG. 1 has essentially oriented itself to the use or the design of the standard software architecture AutoSar®. FIG. 2 now shows an alternative arrangement to the software levels in comparison with the exemplary embodiment in FIG. 1. The integrity manager 3, the function monitoring level 5 and the degradation manager 6 are accordingly realized hierarchically below the runtime environment 2. In this case, the latter may additionally comprise functions of the flow or process monitor 10. The respective processes of the control functions 13a, 13b or further system or auxiliary functions of the software levels are designed in accordance with their safety requirement, e.g. ASIL B and ASIL D.

Figure 3:
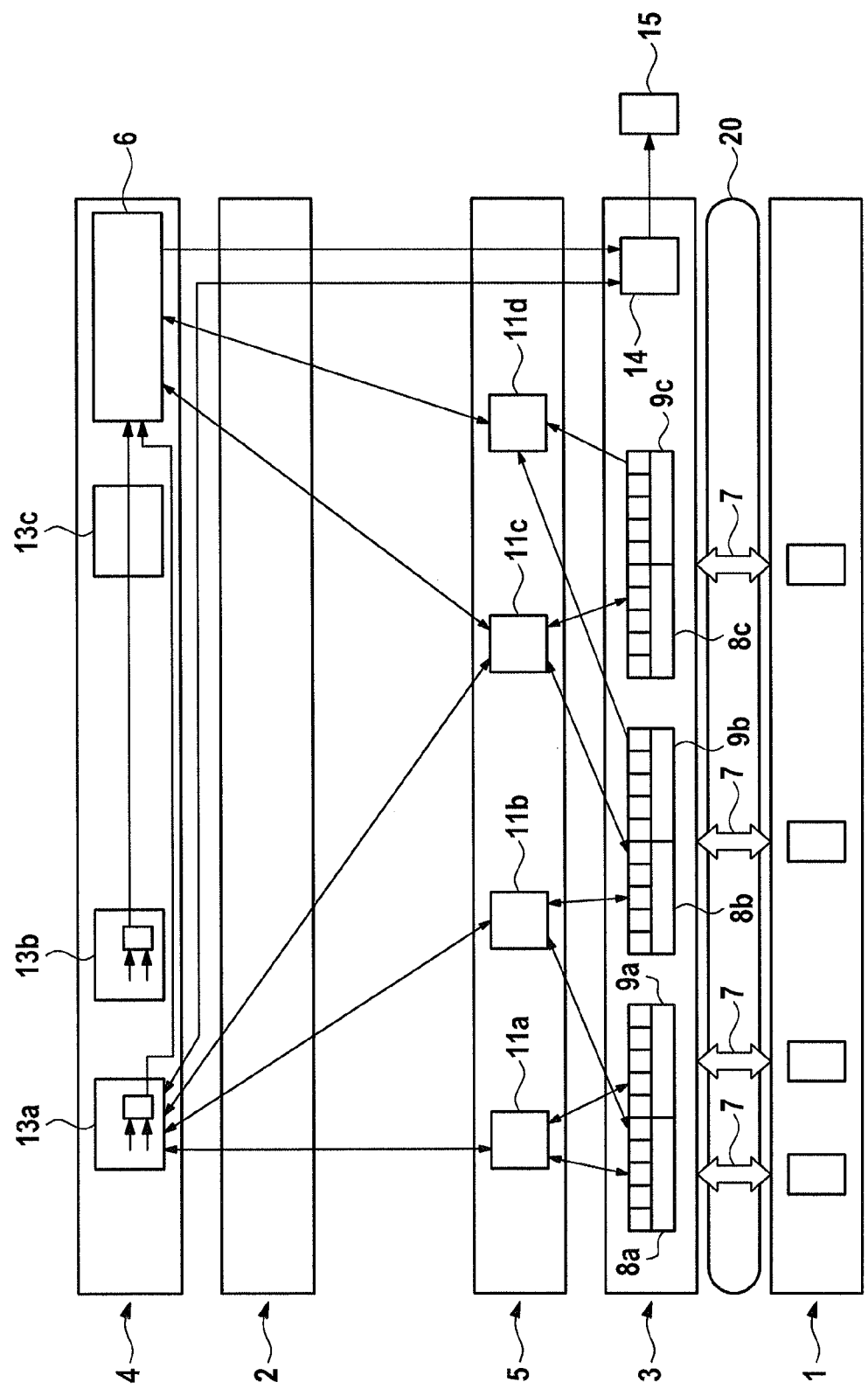
FIG. 3 shows a basic illustration to explain a further exemplary embodiment of the invention.

According to the exemplary embodiment shown in FIG. 3, the degradation manager 6 can also be embodied as an independent software process or independent software function by the control function level 4. On the basis of the example, the degradation measures are executed by the integrity manager 6 via a condition block 14 following plausibilization. Furthermore, a motor vehicle control function or a software process 13c is monitored by a monitoring process 13d with a relatively low safety requirement level, e.g. ASIL B. In addition, a process 13a having a high safety requirement level, e.g. ASIL D, is provided for monitoring the control function 13c and the monitoring process 13b of the control function.

The invention claimed is:

1. A method for improving the functional safety and increasing the availability of an electronic closed-loop control system, for a motor vehicle control system, comprising:
executing, by a processor, at least one basic software component,
executing, by the processor, at least one runtime environment, and
executing, by the processor, at least two levels of application software including:
1) a first software level executing control functions for controlling the vehicle,
2) a second software level executing a function monitor for monitoring the control functions and detecting an error in the control functions, and
executing, by the processor, a first software component that manages encrypted data communicated from at least one peripheral hardware component in the vehicle over at least one communication channel to the processor,
wherein the at least one peripheral hardware component executes at least one of data encryption and data signature to produce the encrypted data communicated from the at least one peripheral hardware component over the at least one communication channel to the first software component executed by the processor, and
wherein the first software component manages the encrypted data communicated from the at least one peripheral hardware component by analyzing integrity, including plausibility, correctness and currentness of the encrypted data,
1) wherein at least one of unencrypted and unsigned information data is provided to the at least one of the first and the second software level in response to the analysis verifying the integrity of at least one of the encrypted data and signed data, or
2) wherein at least one of the encrypted data and the signed data is provided to at least one of the first and the second software level in response to the analysis verifying the integrity of at least one of the encrypted data and the signed data,
wherein the first software component generates an error code which is processed by the at least one of the first and the second software level, when the integrity of at least one of the encrypted and the signed data is not existent, and
wherein at least one of the unencrypted and the unsigned information data are not provided for the application software, or are provided together with the error code, or the unencrypted information data are assigned an implausible value.

2. The method of claim 1, wherein the first software component enables the processor to provide an output from a safety-related function only when diagnosis information provided by the first software component indicates that the safety-related communication to the output of the processor is timely and correct.

3. The method as claimed in claim 1, wherein the first software component is an integrity manager, wherein at least one of the encrypted and signed data communicated via the communication channel are provided for at least one of the integrity manager, the runtime environment and the basic software component, wherein the integrity manager checks the integrity of the communicated data from the communication channel, and wherein the integrity manager uses at least one of the data encryption and the data signature for checking the integrity of the data.

4. The method as claimed in claim 3, wherein the integrity manager is at least one of subordinate to the application software, superordinate to the runtime environment and implemented in the runtime environment, wherein the runtime environment provides at least one of the encrypted and the signed data for the integrity manager.

5. The method as claimed in claim 1, wherein a degradation manager is provided that is at least one of in the form of at least one third software level and in the form of at least one software process of at least one the first and the second software level, wherein the degradation manager comprises at least one degradation level for the control functions of the first software level and a function monitor for the second software level.

6. The method as claimed in claim 5, wherein at least one of the function monitor and the degradation manager uses at least one of the data encryption and the data signature for additional plausibilization of the data.

7. The method as claimed in claim 5, wherein a disconnection function of the degradation manager is executed by at least one software process with high priority.

8. The method as claimed in claim 5, wherein at least one of the integrity of the data, the generated error code and the additional plausibilization of the data is/are taken as a basis for the degradation manager to execute at least one of selective disconnections, degradations for the performance of the motor vehicle control system, the control functions and the function monitor.

9. The method as claimed in claim 5, wherein at least one of the function monitor, the degradation manager and the integrity manager can access at least one of the data encryption and the data signature of the data.

10. The method as claimed in claim 1, wherein at least one of a restart and synchronization for the program flow of a microcontroller executing the method is provided in the course of operation, particularly within a safety time, wherein a safe state is initiated by a disconnection means when the safety time is exceeded.

11. The method as claimed in claim 3, wherein the integrity manager ensures at least one of data-oriented and temporal separation for software components.

12. The method as claimed in claim 11, wherein at least one of the data-oriented and temporal separation is used to disconnect software components with at least one of different safety requirement levels selectively and in prioritized fashion particularly if when independence is infringed.

13. An electronic closed-loop control system, for a motor vehicle control system, for improving the functional safety and increasing the availability of the electronic closed-loop control system, comprising:
    at least one basic software component;
    at least one runtime environment; and
    a processor configured to execute:
        a first software level executing control functions for controlling the vehicle,
        a second software level executing a function monitor for monitoring the control functions and detecting an error in the control functions, and
        a first software component that manages data communicated from at least one peripheral hardware component in the vehicle over at least one communication channel to the processor,
    wherein the at least one peripheral hardware component executes at least one of data encryption and data signature to produce encrypted data communicated from the at least one peripheral hardware component over the at least one communication channel to the first software component executed by the processor, and
    wherein the first software component manages the encrypted data communicated from the at least one peripheral hardware component by analyzing integrity, including plausibility, correctness and currentness, of the encrypted data,
        1) wherein at least one of unencrypted and unsigned information data is provided to the at least one of the first and the second software level in response to the analysis verifying the integrity of at least one of the encrypted data and signed data, or
        2) wherein at least one of the encrypted data and the signed data is provided to at least one of the first and the second software level in response to the analysis verifying the integrity of at least one of the encrypted data and the signed data,
    wherein the first software component generates an error code which is processed by the at least one of the first and the second software level, when the integrity of at least one of the encrypted and the signed data is not existent, and
    wherein at least one of the unencrypted and the unsigned information data are not provided for the application software, or are provided together with the error code, or the unencrypted information data are assigned an implausible value.

* * * * *